(12) United States Patent
Kishi et al.

(10) Patent No.: US 6,656,302 B2
(45) Date of Patent: Dec. 2, 2003

(54) EPOXY RESIN COMPOSITION FOR A FIBER-REINFORCED COMPOSITE MATERIAL, YARN PREPREG, AND PROCESS AND APPARATUS FOR PREPARING THE SAME

(75) Inventors: Hajime Kishi, Ehime (JP); Masazumi Tokunoh, Ehime (JP); Tetsuyuki Kyono, Ehime (JP); Fumiaki Noma, Ehime (JP); Toyokazu Minakuchi, Ehime (JP); Shoji Yamane, Ehime (JP)

(73) Assignee: Toray Industries, Inc., Tokyo (JP)

( * ) Notice: Subject to any disclaimer, the term of this patent is extended or adjusted under 35 U.S.C. 154(b) by 83 days.

(21) Appl. No.: 09/757,652

(22) Filed: Jan. 11, 2001

(65) Prior Publication Data

US 2002/0009581 A1 Jan. 24, 2002

Related U.S. Application Data

(63) Continuation of application No. 08/945,071, filed as application No. PCT/JP97/00502 on Feb. 21, 1997, now Pat. No. 6,228,474.

(51) Int. Cl.[7] .............................................. B65H 81/00
(52) U.S. Cl. ....................... 156/172; 156/162; 156/164; 156/166; 156/169; 156/171; 156/184; 156/185; 156/199
(58) Field of Search ........................... 428/297.4, 299.1, 428/299.4; 156/130, 128.1, 158, 186, 162, 164, 166, 169, 171, 172, 184, 185, 199

(56) References Cited

U.S. PATENT DOCUMENTS

| | | | |
|---|---|---|---|
| 4,309,473 A | 1/1982 | Minamisawa et al. | |
| 4,863,787 A | 9/1989 | Gawin | 428/413 |

FOREIGN PATENT DOCUMENTS

| | | |
|---|---|---|
| JP | 57-021428 | 4/1982 |
| JP | 58-113226 | 6/1983 |
| JP | 2-173125 | 4/1990 |

OTHER PUBLICATIONS

G. Mayorga, Prepreg Manufacturing (pp. 402–412).
A copy of the Supplemental European Search Report for EP Application 97904610.

Primary Examiner—Merrick Dixon
(74) Attorney, Agent, or Firm—Morrison & Foerster LLP (57) ABSTRACT

To provide an epoxy resin composition suitable as a matrix resin for fiber reinforcement, and a yarn prepreg suitable in unwindability, excellent in higher processability due to drapability, high in the tensile strength of the epoxy resin composition after curing, and high in efficiency of the strength of reinforcing fibers.

A yarn prepreg, satisfying the following formulae (1) to (3):

$$50 \leq Wf \leq 80 \quad (1)$$

$$20{,}000 \leq F \leq 100{,}000 \quad (2)$$

$$F/8{,}000 \leq d \leq F/2{,}400 \quad (3)$$

where Wf is the content by weight of the fiber bundle (%), F is the number of filaments in the fiber bundle and d is the width of the prepreg (mm).

An epoxy resin composition for a fiber reinforced composite material, comprising at least the following components [A], [B] and [C]:

[A]: An epoxy resin mixture containing two or more epoxy resins, in such a manner that 100 weight parts of the epoxy resin mixture contains 40 to 79 parts of a monofunctional or bifunctional epoxy resin and 21 to 60 parts of a trifunctional or higher functional epoxy resin and that the epoxy resin mixture is 210 to 370 in epoxy equivalent weight

[B]: Fine particles containing a rubber ingredient and insoluble in the epoxy resins

[C]: A curing agent

15 Claims, 1 Drawing Sheet

EPOXY RESIN COMPOSITION FOR A FIBER-REINFORCED COMPOSITE MATERIAL, YARN PREPREG, AND PROCESS AND APPARATUS FOR PREPARING THE SAME

This application is a continuation of Ser. No. 08/945,071 filed Feb. 17, 1998 U.S. Pat. No. 6,228,474.

TECHNICAL FIELD

The present invention relates to an epoxy resin composition suitable as a matrix resin for fiber reinforcement, and a yarn prepreg in which reinforcing fibers are impregnated with an epoxy resin. Furthermore, the present invention relates to an intermediate material for a fiber reinforced composite material and a fiber reinforced composite material obtained by using the yarn prepregs, and a concrete member reinforced by the composite material. Moreover, the present invention relates to a method for producing yarn prepregs, a method for winding a yarn prepreg, a method for producing a tube made of a fiber reinforced resin, and an apparatus for producing yarn prepregs.

A prepreg in which reinforcing fibers are impregnated with an epoxy resin composition can be processed into a desired form, for example, by lamination, winding, collection, etc., and the uncured epoxy resin can be heated and cured by press molding, autoclave molding, etc. to obtain a composite material with a desired form such as a plate, tube or beam, etc.

Narrow prepregs called yarn prepregs, tow prepregs or strand prepregs (hereinafter called yarn prepregs) can be made into fiber reinforced composite materials with various forms by methods described below.

Firstly, a yarn prepreg is wound around a core shaft at a predetermined angle according to the tape winding method, then a heat shrinkable tape is wound around it, and then it is heat-cured in an oven, to produce a hollow tubular composite material.

Secondly, yarn prepregs are laminated on a tool by the fiber placement method, covered with a bag film, placed into an autoclave, and heat-cured, to produce a composite material with a curved surface form.

Thirdly an intermediate material obtained by covering a plurality of collected yarn prepregs with fibers, preferably synthetic fibers can be twisted, and heated and cured, to produce a twisted cable of a composite material. Composite materials with such a form can be used as various cables for bridges, braces of buildings, tension members of prestressed concrete, reinforcing bars, rock bolts for ground reinforcement and cable bolts.

Furthermore, concrete members reinforced by twisted cables of a carbon fiber reinforced composite material can be used as marine structures required to be corrosion resistant, concrete piles for a vertical shaft which can be directly excavated by a shield machine, etc.

BACKGROUND ART

Fiber reinforced composite materials with an epoxy resin as the matrix resin are widely used in general industrial fields such as aerospace, sports, civil engineering, architecture, etc., and hitherto prepregs, intermediate materials and composite materials obtained by combining epoxy resins of various compositions and reinforcing fibers with various properties have been proposed.

A prepreg is generally like a sheet, and various reinforcing styles are available for respective purposes, for example, a prepreg with continuous fibers arranged in one direction in the flat face of the sheet, a prepreg provided as a woven fabric of continuous fibers, a prepreg with discontinuous fibers arranged in any desired direction, etc.

In addition to the above prepreg sheets, there are yarn prepregs in which carbon filaments arranged in one direction as a continuous fiber bundle are impregnated with a resin, and they are suitably used as cables for bridges, tension members of prestressed concrete, and members for fiber placement and filament winding. To prepare the yarn prepreg, a continuous fiber bundle is impregnated with a resin and once wound around a bobbin. Then, in the molding of a composite material, the yarn prepreg is unwound from the bobbin and provided for molding according to the method as described before. So, the fiber arrangement, drapability, viscosity characteristic in resin curing, properties of cured resin, etc. greatly affect the properties, grade, etc. of the composite material.

Furthermore in recent years, as a result of pursuing the cost reduction of carbon fibers, carbon fibers of a thick fiber bundle with more than 20,000 filaments have appeared, and a yarn prepreg using such carbon fibers has attracted attention. To impregnate the carbon fibers of a thick fiber bundle homogeneously with a matrix resin, as a general method, usually the fiber bundle is thinly widened by opening, etc., and has the resin deposited on it to allow the resin to migrate easily in the thickness direction of the fiber bundle. However, it is suggested that the yarn prepreg obtained by this method generates various disadvantages unless the width is appropriate. For example, if the width is too large, torsion and folding-in in the transverse direction are likely to occur at the guide portion in the step of arranging yarn prepregs in parallel in the production of a composite material, and as a result, the composite material becomes low in the degree to which tensile strength is translateed, etc. On the contrary, if the width is too small (as a result, if the thickness is too large), the impregnation of the prepreg becomes insufficient, and the composite material obtained generates defects such as voids, to lower the mechanical properties.

To translate excellent mechanical performance in general industrial fields such as aerospace, sports, civil engineering and architecture, it is important to let reinforcing fibers translate a high strength. To realize this, the matrix resin used must be excellent in mechanical properties such as fracture toughness.

As prior art for yarn prepregs, JP-A-55-15870 proposes the use of a matrix resin with a thermoplastic resin added to a thermosetting resin, and JP-A-55-78022 proposes to add a high molecular epoxy resin of 5,000 or more in molecular weight. However, both the methods have a disadvantage that if the yarn prepreg is allowed to stand for a long time, the filaments stick to each other, to lose unwindability. Furthermore, it is proposed to mix a thermoplastic resin having a molecular weight of 10,000 or more, higher alcohol, higher fatty acid, etc. (JP-A-57-21428), and to mix a silicone resin and a silicone oil (JP-A-58-113226). These methods are effective to improve the unwindability and drapability of the yarn prepreg to some extent, but the reinforcing fibers cannot translate a high strength.

In the examples of the above mentioned prior art, a carbon fiber bundle of 12,000 filaments only is referred to, and nothing is suggested as to the method of improving the physical properties of a yarn prepreg using carbon fibers of a thick fiber bundle attracting attention in recent years.

Japanese Patent Publication (Kokoku) No. 3-33485 concerning a method and apparatus for producing a yarn prepreg describes a method comprising the steps of arranging in parallel reinforcing fibers like a sheet through a spacer on a sheet coated with a stage B thermosetting resin, laminating a sheet on the other side, pressurizing and heating to impregnate the reinforcing fibers with a resin, slitting the sheet and the spacer portion by a slitter, and winding, or separating the resin impregnated reinforcing fibers from the sheet, to obtain prepreg tapes. This method is the most reliable method to allow the fibers to be impregnated with a predetermined amount of a resin accurately, but is disadvantageous in view of cost since a sheet is necessary for applying the resin and since raising the line speed is technically difficult.

Japanese Patent Publication (Kokoku) No. 5-80330 describes a method for producing a yarn prepreg, comprising the steps of spreading a continuous fiber bundle, to make a band while carrying it; covering the band with a resin free from any solvent using a heating roller and a doctor blade; kneading the covered band, to impregnate the fibers with the resin; compressing the resin impregnated band; and finally cooling to provide the sectional form.

This method has a feature that the resin coating thickness on the fiber bundle in the covering step is controlled by the die interval or hole between the roller and the doctor blade. So, this method is considered to be more excellent than the method described in Japanese Patent Publication (Kokoku) No. 3-33485 having regard to productivity.

However, for the reason described below, it is considered difficult to process a plurality of continuous fiber bundles simultaneously.

First of all, when a case of using a flat roller without any groove on the surface is considered, since the roller is coated on the surface with a uniform thickness of a resin in transverse direction, it is coated with the resin also on the roller surface portions where the fiber bundle does not exist. The resin in these portions is likely to be carried away, being attached to both the edges in the width of the fiber bundle at the moment when the fiber bundle leaves the roller surface. So, at both the edges in the width of the fiber bundle, filaments are likely to be broken and such problems as filament clinging occur.

Furthermore, when a case of processing a plurality of continuous fiber bundles at a time is considered, since fiber bundles arranged in parallel at a proper pitch are brought into contact with the roller surface, the problem of filament breakage at both the ends of a fiber bundle occurs as many times as the number of continuous fiber bundles, and the method cannot be said to be excellent in productivity.

JP-A-8-73630 discloses a method of producing a tow prepreg, comprising the steps of supplying a predetermined amount of a resin to at least one side of a flat tow using a discharge device, etc., to bring the resin into contact with the tow, for permeation into the thickness direction of the tow simultaneously or immediately after; homogeneously impregnating the tow with the resin by the transverse movement of the filaments constituting the tow; and cooling and winding. However, also with this method, it is considered to be difficult to process a plurality of continuous fiber bundles simultaneously for the same reason as mentioned above.

Japanese Patent Publication (Kokoku) No. 5-80330 describes a step of covering the respectively opposite surfaces of bands. So, it can be easily imagined that the problem of filament breakage increases for the same reason as mentioned above.

Furthermore, Japanese Patent Publication (Kokoku) No. 5-80330 includes many steps of kneading, compressing and cooling the resin impregnated bands, and so many factors to raise equipment cost are involved.

Moreover, Japanese Patent Publication (Kokoku) No. 5-80330 describes a method in which covering is executed on the surface of the roller nearest to a doctor blade. That is, at a position upstream of the doctor blade, the molten resin and the fiber bundle are brought into contact with each other, and subsequently, the fiber bundle is passed through the clearance formed between the doctor blade and the roller surface, to control the deposited amount of the resin.

In this method, since the resin is sucked into the clearance by the flow accompanying the carried fiber bundle, a high impregnation effect can be expected, but since the fluff of fibers is likely to clog on the upstream side of the blade, it is disadvantageously difficult to produce a yarn prepreg continuously in a stable state.

Said Japanese Patent Publication (Kokoku) No. 3-33485 and Japanese Patent Laid-Open No. 8-73630 do not refer to the number of carbon fiber filaments at all. Japanese Patent Publication (Kokoku) No. 5-80330 refers only to a carbon fiber bundle with 12,000 filaments. None of them suggests the method for improving the physical properties of a yarn prepreg using a thick carbon fiber bundle attracting attention in recent years.

DISCLOSURE OF THE INVENTION

The object of the present invention is to provide a yarn prepreg using a reinforcing fiber bundle large in the number of filaments, with a suitable width, good in unwindability and drapability to assure high processability, and high tensile strength and high efficiency of reinforcing fiber strength after curing of epoxy resin, and also to provide an intermediate material, a composite material and a concrete member reinforced by the composite material.

The present invention also provides a method and apparatus for producing yarn prepregs using a solvent-less resin excellent in process stability at high speed.

An embodiment of the yarn prepreg of the present invention is a yarn prepreg, comprising a reinforcing fiber bundle and an epoxy resin, and satisfying the following formulae (1) to (3):

$$50 \leq Wf \leq 80 \tag{1}$$

$$20,000 \leq F \leq 100,000 \tag{2}$$

$$F/8,000 \leq d \leq F/2,400 \tag{3}$$

where Wf is the content by weight of the fiber bundle (%), F is the number of filaments in the fiber bundle and d is the width of the prepreg (mm).

An embodiment of the epoxy resin composition for a fiber reinforced composite material of the present invention is an epoxy resin composition for a fiber reinforced composite material, comprising at least the following components [A], [B] and [C]:

[A]: An epoxy resin mixture containing two or more epoxy resins, in such a manner that 100 weight parts of the epoxy resin mixture contains 40 to 79 parts of a monofunctional or bifunctional epoxy resin and 21 to 60 parts of a trifunctional or higher functional epoxy resin and that the epoxy resin mixture is 210 to 370 in epoxy equivalent weight

[B]: Fine particles containing a rubber ingredient and insoluble in the epoxy resins

[C]: A curing agent

As a preferable embodiment of the yarn prepreg of the present invention, the above epoxy resin composition can be used.

An embodiment of the intermediate material for a fiber reinforced composite material of the present invention is an intermediate material for a fiber reinforced composite material, comprising a plurality of said yarn prepregs arranged with their fiber axes kept in parallel.

An embodiment of the fiber reinforced composite material of the present invention is a fiber reinforced composite material, comprising a cured said yarn prepreg or intermediate material.

An embodiment of the method for producing yarn prepregs of the present invention comprises the step of supplying a molten resin to the grooves of a rotating grooved roller, while bringing fiber bundles into contact with the grooves of the grooved roller on the downstream side in the rotating direction, to impregnate the fiber bundles with the molten resin.

An embodiment of the method for winding a yarn prepreg of the present invention comprises the steps of impregnating a fiber bundle with a resin, and winding the yarn prepreg around a core coated with a material excellent in unwindability from the yarn prepreg, at an angle of 2 to 40°.

An embodiment of the method for producing a tube made of a fiber reinforced resin of the present invention comprises the steps of winding a fiber bundle impregnated with a resin according to the above yarn prepreg production method, as it is, around a core according to the filament winding method; heating it together with the core, for curing the resin; and removing the core.

Another embodiment of the method for producing a tube made of a fiber reinforced resin of the present invention comprises the steps of winding a fiber bundle impregnated with a resin, as it is, around a core covered with a flexible tube according to the filament winding method; removing the core only to leave a preform with the flexible tube; placing the preform in a cavity of a mold; and heating with an internal pressure applied to the flexible tube, for curing the resin.

An embodiment of the apparatus for producing yarn prepregs of the present invention comprises a grooved roller for impregnating a fiber bundle with a molten resin, and a molten resin supplying device for supplying the molten resin into the grooves of the grooved roller.

The yarn prepreg of the present invention is excellent in higher processability and is highly capable of translating the tensile strength of the composite material and the tensile strength of the reinforcing fibers after curing the epoxy resin.

The prepreg and intermediate material using the epoxy resin composition of the present invention as a matrix resin is good in unwindability and highly flexible, and the fiber reinforced composite material using the epoxy resin composition is excellent in tensile strength, that is, it is highly capable, of translating the tensile strength of the reinforcing fibers in the composite material. A concrete member reinforced by the fiber reinforced composite material has excellent mechanical properties.

The method and apparatus for producing yarn prepregs of the present invention allows yarn prepregs with a predetermined amount Wr of a solvent-less resin deposited to be produced efficiently and stably.

THE MOST PREFERRED EMBODIMENTS OF THE INVENTION

The present invention is described below in detail.

The number of filaments of a reinforcing fiber bundle used in the yarn prepreg of the present invention is in a range of 20,000 to 100,000. If the number of filaments is smaller than 20,000, the productivity of the fiber bundle declines, and the homogeneity of the intermediate product declines. In the case of a fiber bundle with more than 100,000 filaments, homogeneous impregnation cannot be achieved. The number of filaments is preferably in a range of 22,000 to 80,000, more preferably in a range of 23,000 to 50,000.

The fiber content Wf by weight of the yarn prepreg of the present invention is in a range of 50 to 80%, and if the number of filaments is F, the width (d) is in the range shown by the following formula (3):

$$F/8,000 \leq d \leq F/2,400 \qquad (3)$$

If the width (d) is smaller than the value of the left hand side of the above formula (3), the thickness of the prepreg is too large, and for example, when the prepreg is wound around a core for molding a composite material, the molded product is likely to have level differences on the surface. Furthermore, in the prepreg, voids are likely to be formed, to lower the degree to which the tensile strength of the fibers is translated. On the contrary, if the width (d) is larger than the value of the right hand side, the prepreg is too wide, and torsion and the folding-in in the transverse direction are likely to occur at the guide portion in the step of arranging yarn prepregs in parallel for producing a composite material, being disadvantageously likely to generate fluff. As a result, the degree to which the tensile strength of the reinforcing fibers of the composite material is impregnated declines. The width (d) is preferably $F/7,000 \leq d \leq F/2,700$, more preferably $F/6,000 \leq d \leq F/3,000$.

The thickness of a yarn prepreg cannot be accurately measured by a method of maintaining a micrometer, etc. in direct contact with the prepreg, since the prepreg is deformed. Therefore, the thickness (mm) of a prepreg is calculated from the following formula, using the density $\rho_{CF}$ of the fibers, the density $\rho_{RESIN}$ of the cured resin, the content by weight Wf (%) of the fibers, the width d (mm) of the prepreg, and the weight P (g) per 1 m length of the prepreg:

$$\text{Thickness of prepreg} = \frac{P_d}{d} \times \left[ \frac{1}{\rho_{CF}} + \frac{\frac{100}{Wf} - 1}{\rho_{RESIN}} \right]$$

In this case, the unit weight ($P_{cf}$) of the fibers, the density ($\rho_{CF}$) of the fibers, and the density ($\rho_{RESIN}$) of the cured resin are measured according to the following methods:

Unit Weight ($P_{cf}$) of Fibers

A load is applied to the fiber strand to keep it straight under tension without causing elongation strain, and a 1 mm long specimen is cut off. It is formed like a ring of about 5 cm, and its weight is measured as $P_{cf}$.

Density ($\rho_{CF}$) of Fibers

The same specimen as the above annular specimen is prepared, and its mass ($m_1$) in air is measured. Then, the annular specimen is immersed in ortho-dichlorobenzene, to sufficiently degas the specimen. Then, in the liquid, the mass ($m_2$) is measured. The density is calculated from the following formula:

$$\rho_{CF} = \{m_1/(m_1-m_2)\} \times p'(\text{density of immersion liquid})$$

Density ($\rho_{RESIN}$) of Cured Resin

The mass ($m_1$) of a cured resin specimen in air is measured. Then, the specimen is immersed in methanol to sufficiently degas the specimen, and in the liquid, the mass ($m_2$) is measured. The density is calculated as described for the above density of fibers.

If the content by weight Wf of fibers is smaller than 50%, the availability of the tensile strength of the fibers to the composite material is low. On the contrary if Wf is larger than 80%, the voids in the composite material, stress concentration, etc. lower the tensile strength. Wf is preferably in a range of 60% to 78%, more preferably in a range of 65% to 76%.

In the present invention, if continuous carbon fibers which are substantially untwisted are used, the strength of the carbon fibers is highly translateed in the composite material, and such fibers are especially suitable for applications requiring a high tensile strength, such as a twisted cable of a fiber reinforced composite material, etc. In this case, having regard to cost and processability, the weight is preferably 1.3 to 8.0 g/m.

If the carbon fibers are twisted, the prepreg produced by using them and the composite material produced by using the prepreg may decline in strength, since the filaments constituting the fiber bundle are not arranged in parallel.

As continuous carbon fibers which are substantially untwisted, quantitatively, carbon fibers of 10 cm or more, more preferably 12 cm or more in hook drop value are preferable. The hook drop value is obtained by vertically suspending a carbon fiber bundle in an atmosphere of 23° C. and 60% humidity, hooking a weight of 12 g on to it, and measuring the descending distance of the weight 30 minutes later. This value is small if the fiber bundle is twisted.

Carbon fibers having a tensile elastic modulus of 200 GPa or more and fracture strain energy of 38,000 $kJ/M^3$ or more can also translate their strength to a sufficient extent in a composite material, and are especially suitable for applications requiring a high tensile strength. The tensile elastic modulus is a value E measured according to JIS R 7601, and the fracture strain energy refers to W calculated from formula $W=\sigma^2/2E$ using the tensile strength and the above E value measured according to JIS R 7601.

If a prepreg and a fiber reinforced composite material are produced by using carbon fibers smaller than 200 GPa in tensile elastic modulus, the sectional area must be larger to keep the deformation of the composite material within the design tolerance. So the effect of weight reduction is small, and the product may be able to be used only for limited applications. For example, when the fiber reinforced composite material of the present invention is applied as a cable for a bridge or a tension member of prestressed concrete, it becomes difficult to keep the displacement under tensile stress within a predetermined range.

If the fracture strain energy of carbon fibers is less than 38,000 $kJ/m^3$, it is difficult to translate the strength of carbon fibers to a sufficient extent in a composite material, especially as a tension member such as a cable for a bridge or a tension member of prestressed concrete.

The diameter of the carbon fibers used in the present invention is preferably 3 to $10\mu$. If the diameter of carbon fibers is too thin, fluff is likely to be generated, and the fiber handling convenience and resin impregnability in the step of epoxy resin impregnation become low. On the other hand, if they are too thick, the fiber bundle becomes too stiff, and, unpreferably the fibers cannot smoothly pass at guide portions, etc. in the step of epoxy resin impregnation.

The epoxy resin used for the yarn prepreg of the present invention is not especially limited as far as it is used for fiber reinforced composite materials, and translate to a sufficient extent the strength of the carbon fibers when a composite material is produced from the prepreg, the tensile elongation of the cured epoxy resin is preferably 5% or more.

The tensile elongation of a cured resin is obtained by the following tension test. The tension test is executed by adhesion of a strain gauge to a specimen made by a machine forming a dumbbell specimen according to the method stated in JIS K 7113 from a 2 mm thick resin sheet, and pulling it at a tensile speed of 1 mm/min. The resin curing conditions are 130° C. for 2 hours when dicyandiamide is used as a curing agent in combination with a curing auxiliary, and 180° C. for 2 hours when diaminodiphenyl-sulfone is used as a curing agent.

The yarn prepreg of the present invention preferably has a moderate resin/fiber adhesive strength. The adhesive strength can be achieved by keeping the interlaminar shear strength in a range of 65 to 140 MPa among the properties of the composite material obtained by curing a prepreg. The interlaminar shear strength is more preferably in a range of 75 to 120 MPa. If the interlaminar shear strength is smaller than 50 NPa, its durability in use as a tensile structural member declines. On the other hand, if larger than 140 MPa, the availability of tensile strength declines. This interlaminar shear strength range can be achieved by adjusting the surface treatment of carbon fibers, the elastic modulus of the resin and the interfacial bonding strength.

The epoxy resin used in the yarn prepreg of the present invention can be used in combination with one or more additives generally used for modifying epoxy resins such as thermoplastic resins, elastomers and inorganic particles.

The epoxy resin composition for a fiber reinforced composite material of the present invention contains at least components [A], [B] and [C].

The unwindability and flexibility of the prepreg are greatly affected by the composition of the epoxy resins as the component [A]. The improvement in the tensile strength of the composite material due considerably to the addition of the component [B], but is also affected by the composition of the component [A] used in combination.

As the component [A], 100 weight parts of an epoxy resin mixture containing two or more epoxy resins contain 40 to 79 parts of a monofunctional or bifunctional epoxy resin and 21 to 60 parts of a trifunctional or higher functional epoxy resin, and the epoxy resin mixture is 210 to 370 in epoxy equivalent weight, to keep both the contradictory properties of unwindability and flexibility good. If the epoxy equivalent weight exceeds 370, flexibility cannot be obtained, and if the epoxy equivalent weight is less than 210, adhesiveness is so strong as to lower unwindability. The epoxy equivalent weight is preferably 220 to 360, more preferably 230 to 350. In view of the tensile strength of the composite material as a cured product, a very high crosslinking density is not preferred. That is, if the amount of the trifunctional or higher functional epoxy resin is too large, tensile strength declines. However, to keep good heat resistance, the trifunctional or higher functional epoxy resin must be present in an amount in said range. The amount of the monofunctional or bifunctional epoxy resin is preferably 45 to 75 parts, more preferably 50 to 70 parts. Furthermore, the trifunctional or higher functional epoxy resin, preferably a trifunctional or tetrafunctional epoxy resin is preferably present in an amount of 23 to 55 parts, more preferably 25 to 50 parts.

To obtain a composite material high in tensile strength after curing with the flexibility of the prepreg maintained, it is preferable to include a bifunctional epoxy resin of 50 poises or less in viscosity at 25° C. Especially when a bifunctional epoxy resin of 10 poises to 0.1 poise in the viscosity at 25° C. is present in an amount of 5 to 20 weight parts in 100 weight parts of all the epoxy resins, the flexibility of the prepreg and the unwindability of the yarn are excellent. Furthermore, if, as is preferred, an epoxy resin of 5% or more in the tensile elongation when cured by heating at 130° C. for 2 hours is used as a matrix resin, the composite material obtained is excellent in tensile strength. Similarly, if, as is preferred, an epoxy resin of 1.3 MN/m$^{3/2}$ in fracture toughness $K_{1c}$ when cured by heating at 130° C. for 2 hours is used as a matrix resin, the composite material is excellent in tensile strength. The use of an epoxy resin of 1.5 MN/m$^{3/2}$ or more in $K_{1c}$ is more preferable. The tensile test of a cured resin in this case is performed by adhesion of a strain gauge to a specimen made by a machine forming a dumbbell specimen according to the method stated in JIS K 7113 from a 2 mm resin sheet, and pulling at a tensile speed of 1 mm/min. The fracture toughness test of a cured resin is performed using a 6 mm thick resin sheet by one-side notched three-point bending according to ASTM D 5045-91.

The bifunctional epoxy resin used as an ingredient of the component [A] can be selected, for example, from bisphenol A type epoxy resins, bisphenol F type epoxy resins, biphenyl type epoxy resins, naphthalene type epoxy resins, dicyclopentadiene type epoxy resins, diphenylfluorene type epoxy resins and their combinations.

As such bisphenol type epoxy resins, for example, marketed bisphenol A type epoxy resins include Epikote 827 (180 to 190 in epoxy equivalent weight), Epikote 828 (184 to 194 in epoxy equivalent weight), Epikote 1001 (450 to 500 in epoxy equivalent weight), Epikote 1004 (875 to 975 in epoxy equivalent weight) (these are produced by Yuka Shell Epoxy K.K.), YD 128 (184 to 194 in epoxy equivalent weight) (produced by Toto Kasei K.K.), Epiclon 850 (184 to 194 in epoxy equivalent weight), Epiclon 855 (183 to 193 in epoxy equivalent weight), Epiclon 860 (230 to 270 in epoxy equivalent weight), Epiclon 1050 (450 to 500 in epoxy equivalent weight) (these are produced by Dainippon Ink & Chemicals, Inc.), ELA128 (184 to 194 in epoxy equivalent weight) (produced by Sumitomo Chemical Co., Ltd.), DER331 (184 to 194 in epoxy equivalent weight) (Dow Chemical), etc. Bisphenol F type epoxy resins include Epiclon 830 (165 to 185 in epoxy equivalent weight) (Dainippon Ink & Chemicals, Inc.) and Epikote 807 (160 to 175 in epoxy equivalent weight) (produced by Yuka Shell Epoxy K.K.). Biphenyl type epoxy resins include YX4000 (180 to 192 in epoxy equivalent weight) (produced by Yuka Shell Epoxy K.K.). Naphthalene type epoxy resins include HP-4032 (140 to 150 in epoxy equivalent weight) (produced by Dainippon Ink & Chemicals, Inc.). Dicyclopentadiene type epoxy resins include EXA-7200 (160 to 285 in epoxy equivalent weight) (produced by Dainippon Ink & Chemicals, Inc.). Diphenylfluorene type epoxy resins include EPON HPT1079 (250 to 260 in epoxy equivalent weight) (produced by Shell), etc.

The trifunctional or higher functional epoxy resin used as an ingredient of the component [A] can be selected, for example, from phenol novolak type epoxy resins, cresol novolak type epoxy resins, glycidylamine type epoxy resins such as tetraglycidyl diaminodiphenylmethane, triglycidyl aminophenol and tetraglycidylamine, glycidyl ether type epoxy resins such as tetrakis(glycidyloxyphenyl)ethane and tris(glycidyloxy)methane, and their combinations.

Trade names of marketed phenol novolak type epoxy resins include Epikote 152 (172 to 179 in epoxy equivalent weight), Epikote 154 (176 to 181 in epoxy equivalent weight) (these are produced by Yuka Shell Epoxy K.K.), DER438 (176 to 181 in epoxy equivalent weight) (produced by Dow Chemical), EPN1138 (176 to 181 in epoxy equiva-lent weight), 1139 (172 to 179 in epoxy equivalent weight) (these are produced by Ciba Geigy), etc.

Cyclohexanedimethanol diglycidyl ether or resorcinol diglycidyl ether is a bifunctional epoxy resin of less than 10 poises in the viscosity at 25° C., and if a mixture consisting of 100 weight parts of either of them, 4 weight parts of dicyandiamide and 4 parts of dichlorophenyldimethylurea is cured by heating at 130° C. for 2 hours, a preferred epoxy resin of 5% or more in the tensile elongation as a cured resin can be prepared. It is especially preferable to include 5 to 20 weight parts of either or both of the epoxy resins in 100 weight parts of all the epoxy resins of the component [A].

To improve the toughness of a matrix resin, it is known to add rubber particles. For example, Japanese Patent Laid-Open (Kokai) Nos. 58-83014 and 59-138254 disclose a method in which monomers containing functional groups capable of reacting with an epoxy resin such as an acrylate and acrylic acid are polymerized in an epoxy resin to disperse rubber particles in the epoxy resin.

If a resin composition in which fine particles substantially insoluble in epoxy resins at lower than 80° C. and containing a rubber ingredient as the component [B] are mixed with epoxy resins is molded and cured, the cured product shows a glass transition temperature (Tg) equivalent to the Tg of a resin composition not containing fine particles since the fine particles are insoluble in the epoxy resins. Furthermore, as compared with a case of adding a liquid rubber, since the morphology remains the same irrespective the difference in epoxy matrix or curing conditions, a stable cured product can be obtained characteristically.

It has been known that the component [B] is generally effective for improving the toughness of a resin. However, the inventors found that if a resin with the component [B] added to the component [A] is combined with reinforcing fibers, the tensile strength of the composite material is remarkably improved unexpectedly. Thus, the present invention has been completed. This can never be thought of from a finding that the physical properties of the conventional fiber reinforced composite materials in the fiber direction are dominated by the properties of the reinforcing fibers.

The fine particles containing a rubber ingredient and insoluble in any epoxy resin can be, for example, crosslinked rubber particles consisting of a rubber phase only or a core/shell polymer consisting of a rubber phase and a non-rubber resin phase, etc.

The crosslinked rubber particles can be particles of a crosslinked rubbery random copolymer obtained by copolymerizing an unsaturated compound or an unsaturated compound with a functional group and a crosslinkable monomer, etc.

The unsaturated compound can be, for example, a conjugated diene compound such as butadiene, dimethylbutadiene, isoprene, chloroprene or any of their derivatives, a (meth)acrylate such as methyl (meth)acrylate, propyl (meth)acrylate or butyl (meth)acrylate, any of unsaturated hydrocarbon compounds such as olefins and aromatic vinyl compounds.

The functional group of the unsaturated compound can be, for example, a carboxyl group, epoxy group, hydioxyl group or amino group, etc. Because of moderate reaction with a resin composition consisting of an epoxy resin and a curing agent, a carboxyl group, acid anhydride group or epoxy group is preferable.

The crosslinkable monomer can be a compound with a plurality of polymerizable double bonds in the molecule such as divinylbenzene, diallyl phthalate or ethylene glycol dimethacrylate.

For polymerization, various conventional polymerization methods such as emulsion polymerization, suspension polymerization and solution polymerization can be used. For emulsion polymerization, any conventionally known method can be used. For example, monomers containing several unsaturated compounds and, as required, a crosslinkable monomer are emulsion-polymerized at a certain temperature, using a radical polymerization initiator such as a peroxide catalyst, an emulsifier such as an anionic, cationic, nonionic and/or amphoteric surfactant, in the presence of a molecular weight regulator such as mercaptan or halogenated hydrocarbon, and after a predetermined polymerization conversion has been reached, a reaction terminator is added to terminate the polymerization reaction. Then, the unreactive monomers in the polymerization system are removed by steam distillation, etc., to obtain a copolymer latex. A marketed product can also be used. Marketed crosslinked rubber particles include, for example, XER-91 (produced by Japan Synthetic Rubber Co., Ltd.), CX-MN series produced by Nippon Shokubai), YR-500 series (produced by Toto Kasei), etc.

A core/shell polymer is spherical fine particles usually consisting of a core phase and a shell phase, and a polymer with a double structure consisting of a core and a shell, a core/shell polymer with a multiple structure consisting of a soft core, hard shell and soft shell, etc. are known. Among them, a core/shell polymer with a structure in which a soft core made of an elastomer material is covered with a hard shell obtained by polymerization, and a core/shell polymer with a three-layer structure in which an elastomer shell covering a hard core is polymerized and furthermore covered with a hard shell as the outermost layer can be suitably used since they are easily dispersed into the epoxy resin, as compared with core/shell polymers with other structures.

The material of the core can be selected, for example, from polybutadiene, polyacrylates, polymethacrylates, polybutyl acrylate, styrene-butadiene polymer, ethylene polymer, etc. The material of the shell can be selected, fox example, from polystyrene, polyacrylonitrile, polyacrylates, polymethacrylates, polymethyl methacrylate, etc.

In the case of a core/shell polymer, it is preferable that the core content is 10 to 90 wt %, while the shell content is 90 to 10 wt %. If the core content is less than 10 wt %, a sufficiently high strength effect cannot be obtained. If more than 90 wt %, it can happen that the core cannot be perfectly covered with the shell, that when it is mixed with an epoxy resin, the viscosity of the resin increases with the lapse of time, and that the physical properties of the composite material are dispersed. A preferable core content range is 60 to 90%.

The core/shell polymer can be produced by any of the methods disclosed in U.S. Pat. No. 4,419,496, European Patent No. 45,357 and Japanese Laid-Open (Kokai) No. 55-94917. Marketed products can also be used. Marketed core/shell polymers include, for example, Paraloid EXL2655 (produced by Kureha Chemical Industry Co., Ltd.), TR2122 (produced by Takeda Chemical Industries, Ltd.), EXL-2611, EXL-3387 (produced by Rohm & Haas), etc.

A plurality of kinds of fine particle containing a rubber ingredient and insoluble in any epoxy resin described above can also be used in combination.

The particle size of the fine particles is preferably 10 $\mu$m or less, more preferably 5 $\mu$m or less, still more preferably 1 $\mu$m or less. If the particle size is larger than 10 $\mu$m, it can happen that when the reinforcing fibers are impregnated with the matrix resin, the fine particles are not homogeneously dispersed, to form a heterogeneous molded product. Especially when, as is preferred the particle size is 1 $\mu$m or less, the fiber orientation is not disturbed even in the case of a composite material as high as 50 vol % or more in reinforcing fiber content, and the effect of improving the tensile strength is remarkable. On the other hand, if the fine particles are too small, the effect of improving the tensile strength is lost. So, the particle size is preferably 0.01 $\mu$m or more, more preferably 0.05 $\mu$m or more.

The proper amount of the component [A] is 1 to 20 weight parts against 100 parts by weight of the epoxy resins. If the amount is less than 1 part by weight, the effect of improving the tensile strength is small, and if more than 20 parts by weight, the viscosity of the resin composition is so high as to make the impregnation into the reinforcing fibers difficult.

The component [B] is effective for improving toughness, especially the fracture toughness in a peeling-off mode.

The curing agent used as the component [C] can be selected from aromatic amines such as diaminodiphenylmethane and diaminodiphenylsulfone, aliphatic amines, imidazole derivatives, dicyandiamide, tetramethylguanidine, thiourea added amines, carboxylic anhydrides such as methylhexahydrophthalic anhydride, carboxylic acid hydrazides, carboxylic acid amides, polyphenol compounds, novolak resins, polymercaptan, Lewis acid complexes such as boron trifluoride ethylamine complex, etc.

These curing agents which are microencapsulated can also be suitably used for improving the storage stability of the prepreg.

Any of these curing agents can be used in combination with a suitable curing accelerator to improve the curing activity. Preferable combinations include dicyandiamide and a curing accelerator, for example, a urea derivative such as 3-(3,4-dichlorophenyl)-1,1-dimethylurea (DCMU) or an imidazole derivative, and a carboxylic anhydride or novolak resin and a curing agent such as a tertiary amine.

where $R_1$ and $R_2$ stand for, respectively independently, any group such as H, Cl, $CH_3$, $OCH_3$ or $NO_2$ (n=1 or 2).

A preliminary reaction product of all or some epoxy resins and a curing agent can also be added to the composition. This method may be effective for viscosity control and storage stability improvement.

For controlling the viscosity of the resins and the handling convenience of the prepreg, a thermoplastic resin can also be added to the epoxy resin composition for a fiber reinforced composite material containing the components [A], [B] and [C]. Because they are compatible with the epoxy resins and have no adverse effect on the physical properties of the composite material, preferable thermoplastic resins include polyvinyl formal, polyvinyl butyral, polyethylene oxide, polymethyl methacrylate, polyarnides, polyesters, polyether sulfones, polysulfones, polyether imides, polyarnides, etc. Two or more of these resins can also be used as a mixture. The epoxy resin composition containing the components [A], [B] and [C] can be preferably used for the above mentioned yarn prepreg, and can also be used for other applications such as electronic materials and adhesives other than the fiber reinforced composite materials.

The present invention also provides an intermediate material in which a plurality of said yarn prepregs are arranged with their fiber axes kept in parallel like a sheet or bundle, without being twisted.

An intermediate material sheet is obtained by arranging yarn prepregs like a sheet by the conventionally known drum winding method.

The intermediate material bundle referred to here can be, for example, a material in which the yarn prepregs are fixed in the collected position in the cross section and in which the reinforcing fibers in all the yarn prepregs are arranged in parallel in an axial direction or a material in which these yarn prepregs are braided with polyester fibers, etc., as is known in the prior art (for example, as described in JP-A-6-93579). For covering, as described in JP-A-6-93579, fibers or a narrow synthetic film can be wound around the arranged yarn prepregs. The covering materials which can be used are fibers and synthetic films of various materials such as polyesters, vinylon, polyethylene and polyamides.

The fiber reinforced composite material of the present invention is obtained by arranging a plurality of said yarn prepregs or intermediate material units, and curing the epoxy resin composition usually by heating.

A prepreg can be molded into a composite material by cutting a prepreg sheet, laminating the cut prepreg sheets, and molding them by any of conventionally widely known methods such as press molding, autoclave molding and internal pressure molding.

For example, a composite material sheet can be obtained by cutting a prepreg sheet, laminating a predetermined number of the cut prepreg sheets in a predetermined fiber axis direction on the surface of a tool, covering them with a bag film, etc., for sealing, degassing the inside, and heating and pressurizing in an autoclave.

A cable-like composite material or a beam-like composite material can be obtained, for example, by arranging a plurality of yarn prepregs, introducing them into a forming die with a desired hole sectional form as practiced with pultrusion, and continuously heating for curing, or as described in said JP-A-6-93579, fixing a plurality of yarn prepregs in the collected position in the cross section, for arranging to maintain the reinforcing fibers in all the yarn prepregs parallel to the axial direction, or covering these yarn prepregs, for example, by braiding with synthetic fibers such as polyester fibers, to prepare a unit composite cable, and continuously heat-curing in an oven.

A fiber reinforced composite material such as twisted cable can be obtained, for example, by twisting uncured unit composite cables, and continuously heat-curing in an oven, as described in JP-A-6-93579 and Japanese Patent Publication (Kokoku) No. 6-86718.

The present invention also provides a concrete member reinforced by a fiber reinforced composite material as described above.

In this case, the fiber reinforced composite material can be formed like, for example, a twisted cable, cable, rod, strip, sheet, etc., but the form is not limited to these. In particular, a twisted cable is similar to a so-called steel cable for prestressed concrete in form. So, it can be used like a steel cable for prestressed concrete as a tension member of prestressed concrete or a cable for a bridge.

The yarn prepreg of the present invention can be produced by a wet method of dissolving a matrix resin into a solvent, to lower its viscosity, and immersing a continuous fiber bundle for impregnation, or a hot melt method of heating a resin for lowering its viscosity, coating a roll or release paper with it, to form a film, and pressing a continuous fiber bundle against it for impregnation.

The yarn prepregs of the present invention can be preferably produced by a hot melt method without using release paper. Specifically, while a molten resin is supplied to the grooves of a rotating grooved roller, fiber bundles are brought into contact with the grooves of the grooved roller at a position downstream in the rotating direction, for impregnating the fiber bundles with the molten resin. According to this method, Wf of the yarn prepregs can be stabilized.

The grooved roller in this case refers to a cylindrical roller which has grooves with a certain width and depth formed in the circumferential direction. The width of the grooves can be decided to suit the width of each yarn prepreg to be obtained, but is preferably 2 mm to 30 mm, more preferably 3 mm to 20 mm. If the width is less than 2 mm, the width of the product obtained is too narrow, and the yarn prepreg obtained is not of sufficient practical use. On the other hand, if the width of the grooves is more than 30 mm, it becomes difficult to keep the fiber bundles parallel, and the composite material obtained becomes unstable in mechanical properties.

The depth of the grooves can be decided irrespective of the amount of the resin to be deposited (hereinafter called Wr) in the yarns to be produced, but is preferably about 1 mm to 10 mm, more preferably 3 mm to 10 mm. If the depth is less than 1 mm, the adjustment of the clearance between a blade and groove bottom described later becomes difficult. Even if it exceeds, 10 mm, there is no practical significance, and when fibers cling during the production of the yarn prepregs, it becomes difficult to remove the fibers.

The form of the grooves of the grooved roller is not limited to a rectangle as described above, and can be a trapezoid, V-shape or U-shape.

When a molten resin is supplied to the grooved roller, it is preferable to supply it to the groove bottoms of the grooved roller, but if the side walls of the grooves are not vertical as in the case of trapezoid or V-shape, the molten resin can also be supplied to the side walls of the grooves.

The time during which the fiber bundles are kept in contact with the resin applied on the groove bottoms is decided by the diameter and rotating speed of the roller, the contact angle of the fiber bundles, etc. The roller diameter at the groove bottoms is preferably 50 mm to 500 mm, more preferably 90 mm to 300 mm in view of easy use. The contact angle between the fiber bundles and the grooved roller is preferably 30 to 180°, more preferably 60 to 120°. If the contact angle is less than 30°, the time of contact between the fiber bundles and the molten resin is so short as to lower resin impregnability, and on the other hand, if more than 180°, fibers are likely to cling to the roller. Furthermore, the peripheral speed at the groove bottoms of the roller is preferably almost the same as the fiber bundle carrying speed.

According to the present invention, at the groove bottoms where the contact between the applied resin and the fiber bundles has completed, the resin little remains, and after one revolution of the roller, the molten resin is newly applied to the groove bottoms.

The amount of the resin to be impregnated into the fiber bundles can be controlled by inserting a blade with a width almost equal to the groove width, into each groove of the rotating grooved roller, and adjusting the clearance formed between the bottom of the groove and the blade.

In this case, the adjusting allowance of the clearance is preferably 0.01 mm to 2 mm, more preferably 0.01 mm to 1 mm.

Since a blade is inserted into each groove, it is preferable that its width almost agrees with the groove width. If the width of the blade is smaller than the groove width, more than a required amount of the resin is applied through the clearances formed between the side faces of the groove and the blade to the groove bottom on the downstream side. So, a predetermined Wr cannot be obtained and filament breakage is likely to happen at both the edges in the width of the yarn prepreg as in the case of using a flat (groove-less) roller.

The grooved roller is heated to keep the viscosity of the resin preferably in a range of 1 poise to 200 poises, more preferably in a range of 1 poise to 100 poises.

If the viscosity of the resin is less than 1 poise, the viscosity is too low, and it becomes difficult to accurately control the amount of the resin applied, simply by adjusting the clearance between the blade and the groove bottom. If more than 100 poises, the impregnability of the resin into the fiber bundle may become insufficient.

In the present invention, it is more preferable to preheat the fiber bundles, before the fiber bundles come into contact with the molten resin. The reason is that if the fiber bundles are preheated, the viscosity of the resin declines when the fiber bundles come into contact with the molten resin, to allow easier inpregnation of the resin, and so that, as compared with a case of no preheating, the fiber bundle carrying speed can be raised, to improve productivity.

The fiber bundle preheating temperature range is preferably not lower than the temperature of the molten resin and not higher than (the temperature of the molten resin+10° C.). If the preheating temperature of the fiber bundles is lower than the temperature of the molten resin, the temperature of the resin declines to give a rise in viscosity at the moment when the fiber bundles come into contact with the molten resin, and impregnation may be insufficient. On the other hand, if the preheating temperature is higher than (the temperature of the molten resin +100° C.), the resin is gelled, and it becomes difficult to obtain a yarn prepreg of a good grade.

If the fiber bundles are widened before they come into contact with the molten resin, the resin impregnability can be improved. Most preferably, the fiber bundles are preheated while being widened before they come into contact with the molten resin.

For spreading the fiber bundles, any known method can be used, for example, by arranging a plurality of bars alternately in the direction perpendicular to the fiber bundle carrying direction, and stroking the fiber bundles.

In the present invention, it is also possible to impregnate the fiber bundles with the resin by a first grooved roller and then to bring the fiber bundles into contact with at least one rotating heating roller, to promote the impregnation of the resin. In this case, the faces of the fiber bundles to be brought into contact with the second roller can be on the same side as or on the opposite side to the faces brought into contact with the first grooved roller.

In the present invention, the temperature of the resin impregnated fiber bundles is preferably controlled to be in a range of 0° C. to 35° C. immediately before they are wound around cores. If they are wound at lower than 0° C., the rigidity of the fiber bundles increase, and the yarn prepregs are likely to be folded. On the other hand, if higher than 35° C., the resin is likely to migrate in the steps of winding, etc., and the Wr of the yarn prepregs may be changed.

The yarn prepregs can be controlled in a temperature range of 0° C. to 35° C. by circulating cooling water in the roller of the drive station or applying cooling air to the yarn prepregs, etc.

The present invention also provides a method of winding a yarn prepreg, comprising the steps of impregnating a fiber bundle with a resin, and winding it at an angle of 2 to 40° around the surface of a core around which a film made of a material excellent in releasability from the yarn prepreg is formed.

As a core, a paper tube is often used since it is low in cost. However, if a yarn prepreg is directly wound around the surface of a paper tube, the sticky resin of the yarn prepreg is caught by the surface of the paper tube, to lower the Wr of the unwound yarn prepreg disadvantageously. So, on the surface of a core such as a paper tube, a film of PVC, polyester, polyamide or polypropylene, etc. is formed, and around it, the yarn prepreg is wound at an angle of 2 to 40°.

The angle in this case refers to the angle against an axis perpendicular to the axis of the core. If the angle is less than 2°, the yarn prepreg is hard to unwind because of the tackiness of the resin. On the other hand, if the angle is more than 40° C., the yarn prepreg looks untidy, and due to the vibration during transport, etc., the yarn prepreg comes off from the core. The angle is preferably 5 to 35°.

The present invention also provides a method for producing a tube made of a fiber reinforced resin, comprising the steps of winding a fiber bundle impregnated with a resin by the above mentioned method, as it is, around a core by the filament winding method; heating the fiber bundle together with the core, to cure the resin; and removing the core.

The conventional method of producing a tube made of a fiber reinforced resin by the filament winding method comprises the steps of immersing a continuous fiber bundle without any resin deposited on it, into a bath containing a predetermined resin solution, while winding it around a core; heating it together with the core, to cure the resin; and removing the core. The present invention is characterized in that a fiber bundle impregnated with a resin by the above mentioned method, i.e., a yarn prepreg is wound, as it is, around a core by the filament winding method. The conventional filament winding method presents problems such that Wr is likely to be changed by the winding speed, the concentration of the resin solution, etc., and that the resin deposited on the fiber bundle excessively must be removed by squeezing. However, in the present invention, since Wr is set at a predetermined value in the step of resin impregnation, a tube made of a fiber reinforced resin stable in fiber content can be obtained without using the complicated steps of the conventional method.

The present invention also provides a method for producing a tube made of a fiber reinforced resin, comprising the steps of winding a fiber bundle impregnated with a resin by the above mentioned method, as it is, around a core covered with a flexible tube by the filament winding method; removing the core only, to obtain a preform with a flexible tube; installing the preform in a cavity of a mold; and heating while applying an internal pressure to the flexible tube, to cure the resin.

The conventional method of producing a tube made of a fiber reinforced resin as used in a tennis racket comprises the steps of immersing a continuous fiber bundle without any resin deposited, in a bath containing a predetermined resin solution, while winding it around a core covered with a flexible tube by the filament winding method; removing the core only, to obtain a preform with a flexible tube; installing the preform in a cavity of a mold; and heating while applying an internal pressure to the flexible tube, for curing the resin.

In the present invention, a fiber bundle impregnated with a resin by the above mentioned method is wound, as it is, around a core covered with a flexible tube by the filament winding method. So, for the same reason as described before, a stable tube made of a fiber reinforced resin can be produced efficiently without using the conventional steps.

The present invention also provides an apparatus for producing yarn prepregs, comprising a grooved roller for impregnating a fiber bundle with a molten resin, and a molten resin supplying device for supplying the molten resin to the groove bottoms of the grooved roller.

A preferable embodiment of the yarn prepreg producing apparatus of the present invention is provided with
a creel for supplying fiber bundles,
a resin melting device,
a molten resin metering and supplying device for supplying the molten resin to a resin reservoir while metering it,
a molten resin supplying device with the molten resin reservoir, for supplying the molten resin to a grooved roller,
a grooved roller for impregnating the fiber bundles with the molten resin,
winders for winding the yarn prepregs,
a drive station for carrying the fiber bundles from the creel to the winders, and
a device for circulating a heating medium to the resin melting device, molten resin metering and supplying device, molten resin supplying device and grooved roller.

That is, continuous fiber bundles are unwound from the creel for supplying the fiber bundles, and introduced into the grooved roller, to be impregnated with a molten resin. The grooved roller for impregnating the fiber bundles with the molten resin has the resin melting device, molten resin metering and supplying device for supplying the molten resin to the resin reservoir while metering it, and molten resin reservoir, and the molten resin supplying device for supplying the molten resin to the grooved roller is provided as an attachment. Furthermore, a mechanism capable of supplying a predetermined amount of the resin to the continuous fiber bundles is also provided. The fiber bundles are carried from the creel to the winders by the drive station, and finally, the yarn prepregs are wound around cores by the winders.

The apparatus has a device for circulating a heating medium connected for heating, to be kept at a predetermined temperature.

The creel for supplying the fiber bundle preferably has a mechanism to allow unwinding at the same unwinding tension even the winding diameter of the fiber bundles changes.

If the resin melting device can bring a heating roller into contact with a solid resin, to melt the resin only at the contact portion, for allowing it to drop in the resin reservoir provided below, this method is preferably simple in structure. In this method, if a partition plate pressed against the heating roller is installed, the resin melting device can also be used as the molten resin metering and supplying device for supplying the molten resin while metering it. That is, if the clearance above the roller surface and the rotating speed and width of the roller are changed, the molten resin can be supplied to the resin reservoir, while being metered.

The molten resin metering and supplying device is not limited to the above method, and any known gear pump type discharger, plunger type discharger, extruder, microtube pump, etc. can also be used. When a tube pump or gear pump is used as the molten resin metering and supplying device, it is preferably used also as the molten resin supplying device with a molten resin reservoir, for supplying the molten resin to the grooved roller.

The molten resin supplying device with a molten resin reservoir, for supplying the molten resin to the grooved roller has blades built-in, and is attached to the grooved roller, and the resin collected here passes through the clearance formed between each blade and each groove bottom, to be applied to the groove bottom.

The grooved roller for impregnating the fiber bundles with the molten resin is substantially a grooved kiss roller, and the molten resin applied to the groove bottoms contacts the fiber bundles.

The winders used for winding the yarn prepregs can be known winders.

In view of the object of the present invention, bobbin traverse type is preferable, but the present invention is not limited to it. For better appearance of wound package, a winder called edge softening type is preferred.

The drive station for carrying the fiber bundles from the creel to the winders is composed of at least one rotating roller, and is preferably at least 300 mm in its length of contact with the fiber bundles.

The rotating roller is preferably covered with a teflon, silicon rubber or resin, polypropylene resin or film, etc. not to allow the sticky resin of the yarn prepregs to adhere.

The present invention includes a device for circulating a heating medium to the resin melting device, molten resin metering and supplying device, molten resin supplying device and grooved roller. The device for circulating a heating medium can be a combination of a hot water device and a circulating pump or a combination of an oil heater and a circulating pump.

It is more preferable that a device for preheating the fiber bundles is provided between the creel for supplying the fiber bundles and the device for impregnating the fiber bundles with the molten resin.

The reason is that if the temperature of the fiber bundles is lower than the temperature of the molten resin, the resin drops in temperature, to rise in viscosity, inhibiting the impregnation of the resin into the fiber bundles at the moment when the fiber bundles come into contact with the molten resin. The fiber bundle preheating temperature is preferably not lower than the temperature of the molten resin and not higher than (the temperature of the molten resin+ 100° C.) as mentioned before.

For preheating the fiber bundles, an ordinary heater such as a hot plate or far infrared heater can be used, but it is most preferable to bring the fiber bundles into contact with a rotating heating kiss roller, because the generation of fluff can be inhibited and because processing at a high speed is possible. In this case, to inhibit the generation of fluff, it is preferable to keep the peripheral speed of the kiss roller equal to the fiber bundle carrying speed.

The apparatus of the present invention preferably has a device for spreading the fiber bundles between the creel for supplying the fiber bundles and the grooved roller for impregnating the fiber bundles with the molten resin. The reason is that if the fiber bundles are widened, the resin impregnation can be promoted. In order to allow the fiber bundles to be heated while being widened, if said stroking bars, etc. are arranged in the heating zone, the spreading effect increases.

The grooved roller for impregnating the fiber bundles with the molten resin in the present invention has a molten resin reservoir, and may also contain the molten resin supplying device for supplying the molten resin into the grooved roller, i.e., a grooved heating roller, blades to be inside the grooves of the grooved heating roller and a device for collecting the molten resin. With this construction, the molten resin in the device for collecting the molten resin passes through the clearance formed between the tip of each blade and the bottom of each groove of the heating roller, to be applied to the groove bottom in a predetermined amount.

The amount of the resin to be applied to the groove bottom is decided by the clearance and the rotating speed of the roller, and if the clearance is constant, a certain Wr can be maintained irrespective of the fiber bundle carrying speed as far as the peripheral speed of the groove bottom is the same as the fiber bundle carrying speed.

In a preferable embodiment of the production apparatus of the present invention, the clearance formed between the tip of each blade to be inserted inside each groove of the grooved heating roller and the groove bottom can be controlled in a range of 0.01 mm to 2 mm, more preferably 0.01 mm to 1 mm. If the clearance is less than 0.01 mm, the resin cannot be supplied, hence not deposited, though depending on the viscosity of the resin, and if more than 2 mm, the resin is kept flowing, making the control of Wr substantially difficult.

In a preferable embodiment of the production apparatus of the present invention, the molten resin supplying device with a molten resin reservoir can be heated, and is located upstream, in the roller rotating direction, of the portion where the fiber bundles of the grooved roller for impregnating the fiber bundle with the molten resin contact the roller.

With this construction, the molten resin can be efficiently and accurately applied to the groove bottom surfaces of the grooved roller in a predetermined amount, and in addition since the region where the fiber bundles contacts the roller is located downstream of this region, the fiber bundles are reliably impregnated with the applied resin, and carried to the subsequent step.

Furthermore, as described before, a resin metering and supplying device such as a gear pump type discharger, plunger type discharger, extruder or microtube pump, etc. can also be used to supply the resin in a predetermined amount into the grooves of the roller, instead of controlling the supplied amount of the epoxy resin composition by adjusting the clearance between each blade and each groove bottom. The amount of the resin supplied is preferably at a rate of 1 to 50 g/min. If the supplied amount is smaller than 1 g/min, the resin content in the prepreg may become low. On the contrary, if larger than 50 g/min, the resin content in the prepreg may become high. A more preferable range of the amount supplied is 3 to 40 g/min.

Furthermore, the discharger such as a gear pump can be provided for each groove of the roller. However, supplying the resin to a plurality of grooves on the roller by tournament piping from one discharger is preferable having regard to operation convenience and cost since the number of dischargers can be minimized. One fiber bundle corresponds to each impregnation groove of the roll, to bring a plurality of carbon fiber bundles into contact with a plurality of grooves.

To control the width (d) of the prepregs, for example, the fiber bundles with the resin deposited on them are pressed against a grooved roll with a desired groove width, or are stroked by a die with a desired clearance and as required, pressurized by a roll.

In the method of the present invention, if a carbon fiber bundle satisfying the following formulae (4) and (5) is used, it is preferable since a yarn prepreg with a suitable width can be obtained.

$$F/3{,}000 \leq D \leq F/1{,}200 \quad (4)$$

$$20{,}000 \leq F \leq 100{,}000 \quad (5)$$

EXAMPLES

Example 1

Thirty five parts by weight of bisphenol A type epoxy resin "Epikote 828" produced by Yuka Shell Epoxy K.K., 30 parts by weight of "Epikote 1001", 35 parts by weight of phenol novolak type epoxy resin "Epikote 154" produced by the same manufacturer, 4 parts by weight of dicyandiamide as a curing agent and 4 parts by weight of 3-(3,4-dichlorophenyl)-1,1-dimethylurea (DCMU) as a curing aid were kneaded homogeneously using a kneader, to prepare a matrix resin composition. The composition was heated at 130° C. for 2 hours, to be cured, and the tensile breaking elongation of the cured product was 6.3%.

Then, carbon fibers "Torayca" (registered trade name) T700SC-24K-50C (24,000 filaments, 230 GPa in tensile elastic modulus E, 4,900 MPa in tensile strength a, substantially twistless) produced by Toray Industries, Inc. were opened by spreading bars. Subsequently, said epoxy resin composition controlled at 70° C. was supplied at a rate of 7 g/min to each of the five grooves of a grooved roller heated at 70° C. from one gear pump type discharger through a piping installed in tournament style, and said carbon fiber bundles were brought into contact with the grooves of the grooved roller at a position downstream in the rotating direction of the roller, to produce yarn prepregs of 30% by weight Wr (70% in Wf). The yarn prepregs obtained were 6.0 mm in width (d).

The density ($\rho_{CF}$) and unit weight ($P_{cf}$) of the carbon fibers were respectively 1.80 and 1.65. The density ($\rho_{RESIN}$) of the cured resin was 1.225.

Twenty yarn prepregs obtained as above were collected at a fixed yarn collecting position in a cross section, with the reinforcing fibers arranged in parallel to the axial direction, and they were covered with a knitted fabric of polyester fibers, and cured at 130° C. for 2 hours in a curing furnace. The volume percent Vf of the carbon fibers in the strand obtained was 67 vol %. The strand was cut at a length of 800 mm, and woven fabrics of glass fibers of 200 mm in width impregnated with an epoxy resin were wound around the strand at both the ends. It was cured, and attached to Autograph (98 kN in maximum load) produced by Shimadzu Corp., and a tensile test was conducted at a strain speed of 2 mm/min. In this case, the strand was 3.1 GPa in tensile strength and 95% in strength translation rate.

The strands were arranged like a sheet, to produce a prepreg. Eight plies of the prepreg were laminated on the top surface of a flat tool, and covered with a bag film. The pressure inside the bag was reduced, and the laminate was cured at 100° C. for 1 hour and at 130° C. for 1 hour (64% in Vf). From this unidirectional composite material, a 25 cm long specimen was cut out, and subjected to a tensile test according to ASTM D 3039-76. The tensile strength was 3.0 GPa and the strength translation rate was 96%.

Furthermore, a 1 cm long specimen was cut out, and subjected to an interlaminar shear test according to ASTM D 2344, and the interlaminar shear strength was found to be 105 MPa.

The degree of strength translation referred to above is the measured tensile strength/(the tensile strength of carbon fibers x fiber content by volume), and the tensile strength of carbon fibers was obtained according to JIS R 7601.

Example 2

Carbon fibers "Torayca" (registered trade name) T700SC-24K-50C (24,000 filaments, 230 GPa in E, 4,900 MPa in σ, substantially twistless) produced by Toray Industries, Inc. and the resin composition stated in Example 1 were used to produce yarn prepregs (3.3 mm in width (d)) of 30% in Wr by the same method as described in Japanese Patent Publication No. 6-93579. Then, a strand (68% in Vf) was obtained as described in Example 1. The strand was 3.1 GPa in tensile strength. The unidirectional composite material (64% in Vf) was 2.9 GPa in tensile strength and 93% in the degree of strength translation. The interlaminar shear strength was 101 MPa.

The density ($\rho_{CF}$) and unit weight ($P_{cf}$) of the carbon fibers were respectively 1.80 and 1.65. The density ($\rho_{RESIN}$) of the cured resin was 1.225.

Example 3

Yarn prepregs were produced as described in Example 1, except that a grooved roller with 10 mm wide and 5 mm deep grooves was used after hot melt impregnation with the resin. The yarn prepregs obtained were 9.1 mm in width (d).

The density ($\rho_{CF}$) and unit weight ($P_{cf}$) of the carbon fibers were respectively 1.80 and 1.65. The density ($\rho_{RESIN}$) of the cured resin was 1.225.

The strand produced as described in Example 1 was 3.2 GPa in tensile strength and 96% in degree of strength translation. The unidirectional composite material (63% in Vf) was 2.9 GPa in tensile strength, 95% in degree of strength translation, and 108 MPa in interlaminar shear strength.

Example 4

Fifty parts by weight of bisphenol A type epoxy resin "Epikote 828" produced by Yuka Shell Epoxy K.K., 30 parts by weight of "Epikote 1001", 20 parts by weight of phenol novolak type epoxy resin "Epikote 154" produced by the same manufacturer, and an epoxy equivalent quantity of 4,4'-diaminodiphenylsulfone as a curing agent were kneaded homogeneously by a kneader, to produce a matrix resin composition. The composition was heated at 180° C. for 2 hours, to be cured. The tensile breaking elongation of the cured product was 5.2%.

Carbon fibers "Torayca" (registered trade mark" T700SC-24K-50C (24,000 filaments, 230 GPa in E, 4,900 MPa in σ, substantially twistless) produced by Toray Industries, Inc. were opened by spreading bars as described in Example 1. Subsequently, said epoxy resin composition controlled at 70° C. was supplied at a constant rate of 7 g/min to each of five grooves of a grooved roller heated at 70° C. from one gear pump type discharger through a piping installed in tournament style, and the carbon fiber bundles were brought into contact with the grooves of the grooved roller at a position downstream in the rotating direction of the roller, to produce yarn prepregs of 30% by weight Wr (70% in Wf). The yarn prepregs obtained were 6.2 mm in width (d).

The density ($\rho_{CF}$) and unit weight ($P_{cf}$) of the carbon fibers were respectively 1.80 and 1.65. The density ($\rho_{RESIN}$) of the cured resin was 1.280.

A strand of 66% in Vf was obtained by curing under the same conditions as in Example 1 except that 20 yarn prepregs were cured at 180° C. The strand was 3.0 GPa in tensile strength and 93% in degree of strength translation. The unidirectional composite material (64% in Vf) was 3.1 GPa in tensile strength, 96% in degree of strength translation and 98 MPa in interlaminar shear strength.

Comparative Example 1

Yarn prepregs (70% in Wf and 30% in Wr) were produced as described in Example 1, except that the grooved roller was not used. The yarn prepregs obtained were 12.0 mm in width (d).

A strand was produced as described in Example 1, but when yarn prepregs were collected, the individual yarn prepregs were distorted. The strand obtained was as poor as 2.5 GPa in tensile strength and 75% in degree of strength translation. A prepreg sheet was produced by the drum winding method as described in Example 1, but the yarns were distorted at the guide portion, and the unidirectional composite material obtained was as poor as 2.6 GPa in tensile strength and 82% in degree of strength translation.

Comparative Example 2

Yarn prepregs were produced (70% in Wf and 30% in Wr) as described in Example 1 except that a grooved roller with 2 mm wide and 5 mm deep grooves was used after resin impregnation. The yarn prepregs obtained were 2.1 mm in width (d).

A strand was produced as described in Example 1, and it was as good as 3.2 GPa in tensile strength and 95% in degree of strength translation. On the other hand, a prepreg sheet was produced by the drum winding method as described in Example 1. The unidirectional composite material obtained was 2.4 GPa in tensile strength, 76% in degree of strength translation and 60 MPa in interlaminar shear strength.

Example 5

(1) Preparation of Matrix Resin Composition

The following raw materials were kneaded using a kneader, to produce a matrix resin composition.

Bisphenol A type epoxy resin (Epikote 8282 produced by Yuka Shell Epoxy KK.) 35 parts by weight Bisphenol A type epoxy resin (Epikote 1001 produced by Yuka Shell Epoxy K.K) 30 parts by weight Phenol novolak type epoxy resin (Epikote 154 produced by Yuka Shell Epoxy K.K.) 35 parts by weight Fine rubber particles (0.2 μm in average particle size) (Paraloid EXL2655 produced by Kureha Chemical Industry Co., Ltd.) 10 parts by weight Dicyandiamide 4 parts by weight DCMU 4 parts by weight This epoxy resin composition was 269 in epoxy equivalent weight. The cured resin product was 6.5% in tensile breaking elongation. The resin was 1.94 MN/m$^{3/2}$ in $K_{1C}$.

(2) Preparation of Prepreg

Carbon fibers "Torayca" (registered trade name) T700SC-24000-50C (230 GPa in E, 4900 MPa in σ, and 7200 deniers in fineness) produced by Toray Industries, Inc. arranged in one direction were impregnated with said resin composition, but heat melted, to achieve a resin content of 30% by weight, and a prepreg sheet was produced by the drum winding method.

(3) Preparation of Composite Material

Eight plies of the prepreg sheet were laminated on the top surface of a flat tool, and covered with a bag film, and the inside pressure was reduced. The laminate was cured at 100° C. for 1 hour and at 135° C. for 1 hour in an oven. The Tg of the cured product was measured at a heating rate of 10° C./min by differential thermal analysis and found to be 130° C.

From the unidirectional composite material, a 25 cm long specimen was cut out, and subjected to a tensile test according to ASTM D 3039-76. The tensile strength was 2.85 GPa and the degree of strength translation was 97%.

The degree of strength translation referred to here is the measured tensile strength/(the tensile strength of reinforcing fibers×fiber content by volume), and the tensile strength of reinforcing fibers was obtained according to JIS R 7601.

Example 6

The following raw materials were kneaded using a kneader, to produce a matrix resin composition.

Bisphenol A type epoxy resin (Epikote 828 produced by Yuka Shell Epoxy K.K.) 25 parts by weight Bisphenol A type epoxy resin (Epikote 1001 produced by Yuka Shell Epoxy K.K.) 35 parts by weight Phenol novolak type epoxy resin (Epikote 154 produced by Yuka Shell Epoxy K.K.) 35 parts by weight Cyclohexanedimethanol diglycidyl ether (Heloxy MK107 produced by Rhone Poulenc) 5 parts by weight Fine rubber particles (0.2 μm in average particle size) (Paraloid EXL2655 produced by Kureha Chemical Industry Co., Ltd.) 7 parts by weight Dicyandiamide 4 parts by weight DCMU 4 parts by weight The epoxy resin composition was 281 in epoxy equivalent weight. The cured resin product was 6.2% in tensile breaking elongation. The resin was 2.03 MN/m$^{3/2}$ in fracture toughness $K_{1C}$.

The same carbon fibers as used in Example 5 were used, to produce a prepreg sheet and a unidirectional composite material as described in Example 5. A tensile test was conducted also as described in Example 5. The tensile strength was 2.88 GPa and the degree of strength translation was 98%.

Example 7

Evaluation was carried out as described in Examples 5 and 6, except that the following matrix resin composition was produced.

Bisphenol A type epoxy resin (Epikote 828 produced by Yuka Shell Epoxy K.K.) 35 parts by weight Bisphenol A type epoxy resin (Epikote 1001 produced by Yuka Shell Epoxy K.K.) 25 parts by weight Phenol novolak type epoxy resin (Epikote 154 produced by Yuka Shell Epoxy K.K.) 28 parts by weight Resorcinol glycidyl ether (Denacol EX201 produced by Nagase Kasei K.K.) 12 parts by weight Fine rubber particles (0.2 μm in average particle size) (Paraloid EXL2655 produced by Kureha Chemical Industry Co., Ltd.) 7 parts by weight Dicyandiamide 4 parts by weight DCMU 4 parts by weight The epoxy resin composition was 247 in epoxy equivalent weight. The cured resin product was 6.8% in tensile breaking elongation. The resin was 2.11 MN/m$^{3/2}$ in fracture toughness $K_{1C}$.

In this case, the unidirectional composite material was 2.82 GPa in tensile strength and 96% in degree of strength translation.

Example 8

Evaluation was carried out as described in Example 5, except that the following raw materials were kneaded using a kneader, to produce a matrix resin composition.

Bisphenol A type epoxy resin (Epikote 828 produced by Yuka Shell Epoxy K.K.) 35 parts by weight Bisphenol A type epoxy resin (Epikote 1001 produced by Yuka Shell Epoxy K.K.) 25 parts by weight Phenol novolak type epoxy resin (Epikote 154 produced by Yuka Shell Epoxy K.K.) 28 parts by weight Resorcinol glycidyl ether (Denacol EX201 produced by Nagase Kasei K.K.) 12 parts by weight Fine rubber particles (0.2 μm in average particle size) (Paraloid EXL2655 produced by Rohm & Haas) 15 parts by weight Dicyandiamide 4 parts by weight DCMU 4 parts by weight The epoxy resin composition was 247 in epoxy equivalent weight. The cured resin product was 7.0% in tensile breaking elongation. The resin was 2.34 MN/m$^{3/2}$ in fracture toughness $K_{1C}$.

The unidirectional composite material was 2.91 GPa in tensile strength and 99% in degree of strength translation.

Example 9

Evaluation was carried out as described in Example 5, except that the following raw materials were kneaded using a kneader, to produce a matrix resin composition.

Bisphenol A type epoxy resin (Epikote 828 produced by Yuka Shell Epoxy K.K.) 35 parts by weight Bisphenol A type epoxy resin (Epikote 1001 produced by Yuka Shell Epoxy K.K.) 25 parts by weight Phenol novolak type epoxy resin (Epikote 154 produced by Yuka Shell Epoxy K.K.) 28 parts by weight Resorcinol glycidyl ether (Denacol EX201 produced by Nagase Kasei K.K.) 12 parts by weight Fine rubber particles (0.07 μm in average particle size) (XER-91 produced by Japan Synthetic Rubber Co., Ltd.) 15 parts by weight Dicyandiamide 4 parts by weight DCMU 4 parts by weight The epoxy resin composition was 247 in epoxy equivalent weight. The cured resin product was 6.5% in tensile breaking elongation. The resin was 1.84 N/m$^{3/2}$ in fracture toughness $K_{1C}$.

The unidirectional composite material was 2.73 GPa in tensile strength and 93% in degree of strength translation.

Example 10

(1) Preparation of Matrix Resin Composition

The following raw materials were kneaded using a kneader, to produce a matrix resin composition.

Bisphenol A type epoxy resin (Epikote 828 produced by Yuka Shell Epoxy K.K.) 25 parts by weight Bisphenol A type epoxy resin (Epikote 1001 produced by Yuka Shell Epoxy K.K.) 35 parts by weight Phenol novolak type epoxy resin (Epikote 154 produced by Yuka Shell Epoxy K.K.) 35 parts by weight Cyclohexanedimethanol diglycidyl ether (Heloxy MK107 produced by Rhone Poulenc) 5 parts by weight Fine rubber particles (0.2 μm in average particle size) (Paraloid EXL2655 produced by Kureha Chemical Industry Co., Ltd.) 7 parts by weight Dicyandiamide 4 parts by weight DCMU 4 parts by weight The epoxy resin composition was 281 in epoxy equivalent weight. The cured resin product was 6.2% in tensile breaking elongation. The resin was 2.03 MN/m$^{3/2}$ in fracture toughness $K_{1C}$.

The unidirectional composite material was 2.79 GPa in tensile strength and 95% in degree of strength translation.

Example 11

The following raw materials were kneaded using a kneader, to produce a matrix resin composition.

Bisphenol A type epoxy resin (Epikote 828 produced by Yuka Shell Epoxy K.K.) 21 parts by weight Bisphenol A type epoxy resin (Epikote 1001 produced by Yuka Shell Epoxy K.K.) 38 parts by weight Phenol novolak type epoxy resin (Epikote 154 produced by Yuka Shell Epoxy K.K.) 35 parts by weight Cyclohexanedimethanol diglycidyl ether (Heloxy MK107 produced by Rhone Poulenc) 6 parts by weight Fine rubber particles (0.2 μm in average particle size) (Paraloid E655 produced by Kureha Chemical Industry Co., Ltd.)

7 parts by weight
Dicyandiamide 3.5 parts by weight
DCMU 4 parts by weight

The epoxy resin composition was 289 in epoxy equivalent weight. The cured resin product was 6.2% in tensile breaking elongation. The resin was 2.13 $MN/m^{3/2}$ in fracture toughness $K_{1C}$.

Carbon fibers "Torayca" T700SC-1200-50C (230 GPa in E, 4900 MPa in σ, 7200 deniers in fineness) produced by Toray Industries, Inc. were impregnated with the above resin composition, but heat melted, to achieve a resin content of 30% by weight, while being wound around paper tubes as they are, to produce 4 mm wide yarn prepregs.

Then, twenty yarn prepregs were bundled, with their fiber axes maintained in parallel, introduced into a die heated to 130° C., and drawn to continuously cure the matrix resin, for obtaining a linear composite material of 3.6 mm in diameter. The composite material was cut at a length of 800 mm, and 200 mm wide woven fabrics of glass fibers impregnated with an epoxy resin were wound around the composite material at both the ends, and cured. The specimen was installed in Autograph (98 kN in maximum load) produced by Shimadzu Corp., and a tension test was conducted at a strain speed of 2 mm/min.

In this case, the linear composite material was 2.82 GPa in tensile strength and 96% in degree of strength translation.

Example 12

Carbon fibers "Torayca" T700SC-12000-50C (230 GPa in E, 4900 MPa in σ, 7200 deniers in fineness) produced by Toray Industries, Inc. and the resin composition described in Example 11 were used to produce a unit composite cable to achieve a resin weight content of 34 vol % according to the method stated in JP-A-6-93579, and the tensile strength was measured as described in Example 5.

In this case, the linear composite material was 3.04 GPa in tensile strength and 94% in degree of strength translation.

Example 13

Eleven yarn prepregs described in Example 11 were collected, with their fiber axes maintained in parallel, and covered around them with synthetic fibers by braiding, to obtain an uncured strand. Seven such strands were twisted, while being continuously heated and cured in a curing furnace at 130° C., to produce a twisted composite material cable of about 13 mm in diameter. The twisted composite material cable was cut at a length of 1000 mm, and was fixed at both the ends for 300 mm by expansive mortar. The specimen was installed in a tensile tester (500 kN in maximum load) produced by Instron, and a tension test was conducted at a strain speed of 1 mm/min. In this case, the twisted composite material cable was 280 kN in tensile breaking yield.

Example 14

Three twisted composite material cables described in Example 13 as tension members, two reinforcing bars D13, reinforcing bars D10 as stirrups and ready mixed concrete were used to manufacture a 4.4 m long beam with a T section of 40 cm in height, 40 cm in width and 15 cm in web width. It was manufactured outdoors, using a wooden mold. The concrete was water spray-cured for 3 days, and at age of 11 days, the mold was dismantled. Then, it was air-cured.

The strain introduced into the twisted composite material cable was 70% of the breaking yield, and the beam was designed to be broken at the twisted composite material cable.

The concrete beam as a simple beam with a span of 4.0 m was loaded at two points with a pure bending section of 0.8 m, and controlled to be displaced in one direction gradually increasingly. After a bending crack occurred, the beam was once unloaded, and subsequently displaced until breaking occurred.

The load was measured by a load cell, and the displacement was measured by a high sensitivity type displacement seismograph. The strain of the tension member was measured by a wire strain gauge.

The bending ultimate yield of the beam member was 232 kN which well agreed with an analytical value of 227 kN, and confirmed that they can be calculated and designed like those of a beam using a conventional steel wire for pre-stressed concrete.

Comparative Example 3

Evaluation was carried out as described in Example 5, except that the following raw materials were kneaded using a kneader, to produce a matrix resin composition.

Bisphenol A type epoxy resin (Epikote 828 produced by Yuka Shell Epoxy K.K.) 35 parts by weight Bisphenol A type epoxy resin (Epikote 1001 produced by Yuka Shell Epoxy K.K.) 30 parts by weight.

Phenol novolak type epoxy resin (Epikote 154 produced by Yuka Shell Epoxy K.K.) 35 parts by weight Dicyandiamide 4 parts by weight DCMU 4 parts by weight The epoxy resin composition was 269 in epoxy equivalent weight. The cured resin product was 5.5% in tensile breaking elongation. The resin was 1.06 $MN/m^{3/2}$ in fracture toughness $K_{1C}$.

The unidirectional composite material was 2.50 GPa in tensile strength and 85% in degree of strength translation.

Comparative Example 4

Evaluation was carried out as described in Example 5, except that the following raw materials were kneaded using a kneader, to produce a matrix resin composition.

Bisphenol A type epoxy resin (Epikote 828 produced by Yuka Shell Epoxy K.K.) 15 parts by weight Metaaminophenol type epoxy resin (ELM120 produced by Sumitomo Chemical Co., Ltd.) 50 parts by weight Phenol novolak type epoxy resin (Epikote 154 produced by Yuka Shell Epoxy K.K.) 35 parts by weight Fine rubber particles (0.2 μm in average particle size) (Paraloid EXL2655 produced by Kureha Chemical Industry Co., Ltd.)
7 parts by weight
Dicyandiamide 4 parts by weight
DCMU 4 parts by weight The epoxy resin composition was 149 in epoxy equivalent weight. The cured resin product was 3.8% in tensile breaking elongation. The resin was 1.25 $MN/m^{3/2}$ in fracture toughness $K_{1C}$.

The unidirectional composite material was 2.56 GPa in tensile strength and 87% in degree of strength translation.

Comparative Example 5

(1) Preparation of Matrix Resin Composition

Evaluation was carried out as described in Example 5, except that the following raw materials were kneaded using a kneader, to produce a matrix resin composition.

Bisphenol A type epoxy resin (Epikote 828 produced by Yuka Shell Epoxy K.K.) 25 parts by weight Bisphenol A type epoxy resin (Epikote 1001 produced by Yuka Shell Epoxy K.K.) 35 parts by weight Phenol novolak type epoxy resin (Epikote 154 produced by Yuka Shell Epoxy K.K.) 35 parts by weight Cyclohexanedimethanol diglycidyl ether (Heloxy MK107 produced by Rhone Poulenc) 5 parts by weight CTBN-epoxy reaction product 10 parts by weight Dicyandiamide 4 parts by weight DCMU 4 parts by weight The CTBN-epoxy reaction product was the reaction product (9600 in number average molecular weight) of liquid rubber Hycar CTBN1300×13 (27% in AN content, produced by Ube Industries, Ltd.) and Epikote 828. The epoxy resin composition was 288 in epoxy equivalent weight. The cured resin product was 5.8% in tensile breaking elongation. The resin was 1.35 $MN/m^{3/2}$ in fracture toughness $K_{1C}$.

The unidirectional composite material was 2.41 GPa in tensile strength and 82% in degree of strength translation.

Example 15

Figure 1:
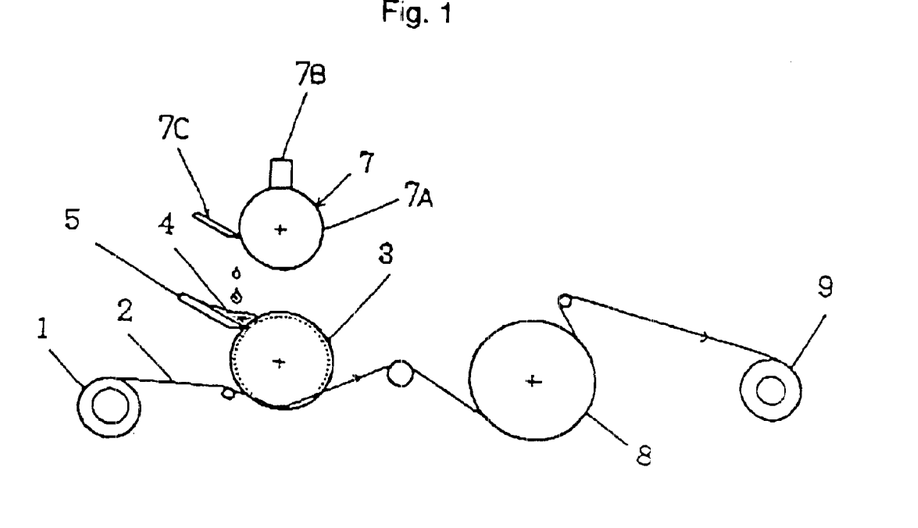
FIG. 1 is a schematic drawing showing an example of the apparatus for producing yarn prepregs of the present invention.
Figure 3:
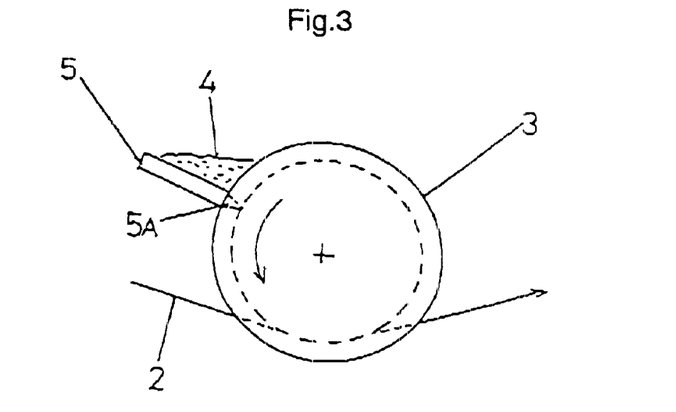
FIG. 3 is a schematic vertical view showing the grooved roller.

As shown in FIG. 3, continuous fiber bundles 2 wound around a creel 1 are unwound to be brought into contact with the bottom of a grooved roller 3, and are guided through a drive station 8 to winders, to be wound. Close to the grooved roller 3, a molten resin supplying device 4 with bladed 5A at the tip, provided with a bottom plate for storing the resin is installed, and a resin supplying device 7 is installed above the molten resin supplying device 4. The resin supplying device 7 has a heating roller 7A, and a resin block 7B supplied to the heating roller 7A is rendered molten by the heating roller 7A. The molten resin is pressed against the heating roller 7A by a partition plate 7C. With this construction, the molten resin is metered and supplied to a resin reservoir 4.

Figure 2:
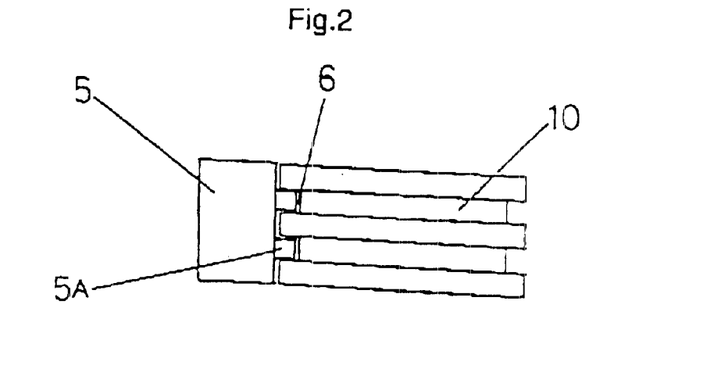
FIG. 2 is a schematic plan view showing a grooved roller.

The grooved roller 3 has grooves 10 as shown in FIGS. 2 and 3. Between the bottoms of the grooves 10 and the blades 5A, certain clearances 6 are formed, and by the rotation of the grooved roller 3, the resin in the resin reservoir is applied to the groove bottoms in a predetermined amount respectively, so that the fiber bundles 2 running in contact with the grooves 10 may be impregnated with the resin.

In the above apparatus, carbon fibers Torayca T700SC-24000-50C and an epoxy resin composition were used to produce yarn prepregs.

The epoxy resin composition consisted of 20 parts of epi-bis liquid resin Epikote 828, 45 parts of epi-bis solid resin Epikote 1001, 35 parts of phenol novolak type epoxy resin Epikote 154, 3.5 parts of dicyandiamide as a curing agent and 4 parts of DCMU (3,4dichlorophenyl-1,1-dimethylurea).

The temperature of the grooved kiss roller and the temperature of the resin reservoir were kept at 80° C., and the epoxy resin composition melted at 80° C. was supplied in a certain amount to the portion. In this case, the clearance between each blade and each groove bottom was changed in a range of 0.12 mm to 0.18 mm, and the yarn carrying speed was changed between 5 m/min and 30 m/min, to produce yarn prepregs. Later, a solvent (methyl ethyl ketone) was used to remove the epoxy resin composition, and Wr was measured. The groove width was 10 mm, and the resin viscosity was 45 poises (80° C.). The results are shown in Table 1.

As shown in Table 1, according to the present invention, irrespective of the fiber bundle carrying speed, Wr was kept constant, and solvent-less yarn prepregs with a predetermined Wr can be efficiently produced by adjusting the clearance only.

Example 16

Yarn prepregs were produced as described in Example 15, except that the angle was changed between 1 to 45° C., and the prepegs wound as bobbins. The yarn prepreg bobbins were unwound in a room at 23° C. at a yarn speed of 3 m/min, to measure the unwinding tension, for evaluation of unwindability.

The results are shown in Table 2. It can be seen that yarn prepregs can be unwound without any problem at a low tension in an angle range of 2 to 40°.

Example 17

While yarn prepregs were produced as described in Example 15, they were wound at an angle of about 30° around mandrels covered with a 50 μm thick nylon tube, directly mounted on a filament winding device, instead of bobbins, and the mandrels were removed. Each wound preform was placed in a mold with a cavity with a form of a racket frame, and while air was blown into the nylon tube, the mold was heated at 130° C. for 30 minutes, to cure the epoxy resin composition, thus obtaining a composite material with a form of a racket frame. A good racket frame free from voids and without any problem in appearance and frame rigidity could be obtained.

Industrial Applicability

The epoxy resin composition, yarn prepreg and intermediate material of the present invention can provide a fiber reinforced composite material and a concrete member which can be widely used in general industrial fields such as aerospace, sports, and civil engineering and architecture.

TABLE 1

| Clearance (mm) | Carrying speed (m/min) | Wr |
| --- | --- | --- |
| 0.12 | 5 | 0.17 |
|  | 10 | 0.17 |
|  | 20 | 0.17 |
|  | 30 | 0.17 |
|  | 50 | 0.16 |
| 0.15 | 5 | 0.29 |
|  | 10 | 0.30 |
|  | 20 | 0.30 |
|  | 30 | 0.29 |
|  | 50 | 0.30 |
| 0.18 | 5 | 0.40 |
|  | 10 | 0.40 |
|  | 20 | 0.40 |
|  | 30 | 0.40 |
|  | 50 | 0.39 |

TABLE 2

| Angle (°) | Unwinding tension (g) | Evaluation result |
| --- | --- | --- |
| 1 | 1500 | Unwinding not allowed halfway |
| 2 | 850 | Yarns disordered a little |
| 10 | 700 | Unwinding could be achieved without any problem |
| 40 | 680 | Unwinding could be achieved without any problem |
| 45 | 650 | Deformation occurred during unwinding |

What is claimed is:

1. A method for producing yarn prepregs, comprising the step of continuously applying a molten resin to bottoms of the grooves of a rotating grooved roller, while bringing fiber bundles into contact with the bottoms of the grooves at a position downstream in the rotating direction, so that the fiber bundles may be impregnated with the applied resin.

2. A method for producing yarn prepregs according to claim 1, wherein a blade with almost the same width as the groove width is inserted inside the groove of the rotating grooved roller, to adjust the clearance formed between the blade and the bottom of the groove, so that the amount of the molten resin to be impregnated into the fiber bundle is controlled.

3. A method for producing yarn prepregs according to claim 1, wherein the rotating grooved roller is heated.

4. A method for producing yarn prepregs according to claim 1, wherein the viscosity of the molten resin is 1 poise to 200 poises.

5. A method for producing yarn prepregs according to claim 1, wherein the fiber bundles are heated to at least not lower than the temperature of the molten resin, before they are brought into contact with the molten resin.

6. A method for producing yarn prepregs according to claim 1, wherein the fiber bundles are widened before the fiber bundles are brought into contact with the molten resin.

7. A method for producing yarn prepregs according to claim 1, wherein the fiber bundles are heated and widened before the fiber bundles are brought into contact with the molten resin.

8. A method for producing yarn prepregs according to claim 1, wherein the fiber bundles are impregnated with the resin, and subsequently brought into contact with at least one rotating heating roll.

9. A method for producing yarn prepregs according to claim 1, wherein when the fiber bundles impregnated with the molten resin are wound around cores, and the temperature of the resin impregnated fiber bundles is controlled in a range of 0° C. to 35° C. immediately before they are wound around the cores.

10. A method for producing yarn prepregs according to claim 1, wherein the number F of filaments, width D (mm) and thickness T (mm) of each fiber bundle satisfy the following formulae (4) and (5):

$$F/3{,}000 \leq D \leq F/1{,}200 \qquad (4)$$

$$20{,}000 \leq F \leq 100{,}000 \qquad (5).$$

11. A method for producing yarn prepregs according to claim 1, wherein the resin is supplied in a predetermined amount to a plurality of grooves of the grooved roller by a piping installed in tournament style from the molten resin metering and supplying device for supplying the molten resin to the grooves of the grooved roller for impregnating the fiber bundles with the molten resin.

12. A method for producing yarn prepregs according to claim 11, wherein the molten resin metering and supplying device is a gear pump type discharger, plunger type discharger, extruder or microtube pump.

13. A method for producing yarn prepregs according to claim 10, wherein the molten resin is an epoxy resin.

14. A method for producing yarn prepregs according to claim 10, wherein the fiber bundles are carbon fibers.

15. A method for producing yarn prepregs according to claim 13, wherein the fiber bundles are carbon fibers.

* * * * *